ABSTRACT OF THE DISCLOSURE

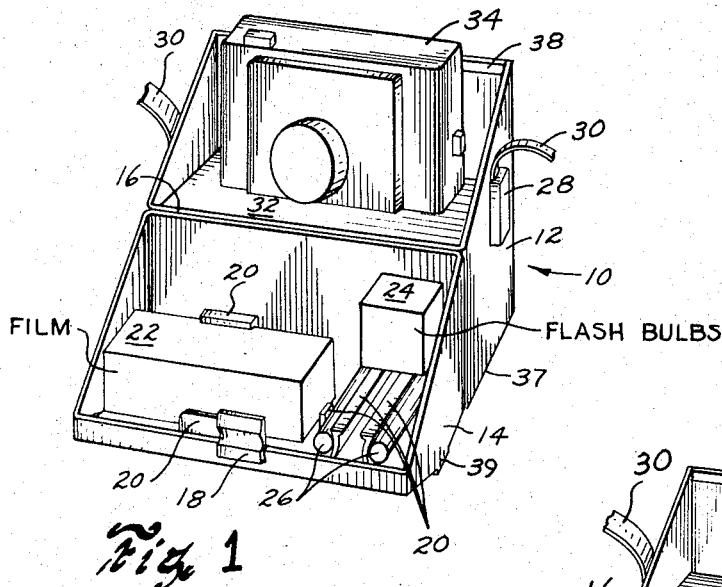
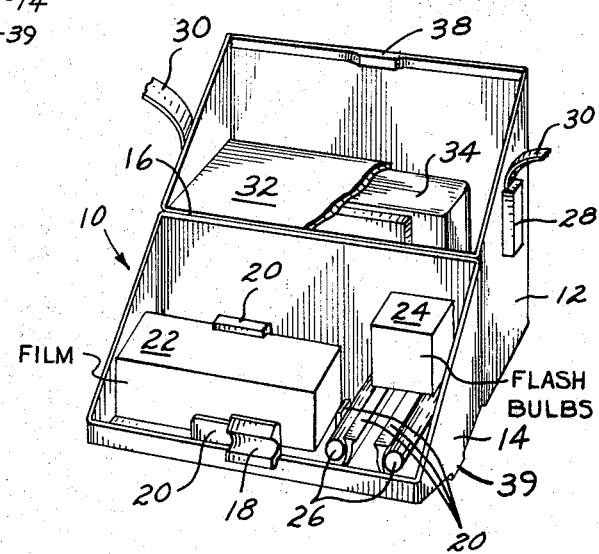
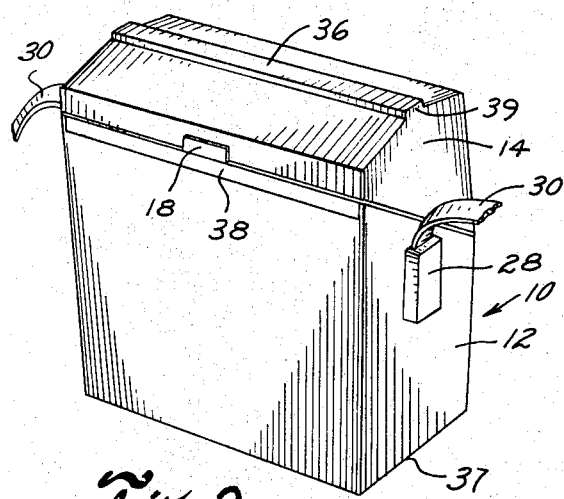
Jan. 9, 1968  D. E. EVERBURG  3,362,448
CAMERA CASE
Filed July 12, 1966
INVENTOR.
DONALD E. EVERBURG 3,362,448
CAMERA CASE
Donald E. Everburg, Southbridge, Mass., assignor to American Optical Company, Southbridge, Mass., a voluntary association of Massachusetts
Filed July 12, 1966, Ser. No. 564,655
1 Claim. (Cl. 150—52)

A camera storage, carrying and display case having hollow body and cover portions of rigid construction hinged together for opening and closing of the case with means on the cover portion for leveling the case upon a plane surface when the case is fully opened for display purposes. A camera display shelf is positioned above a storage compartment in the body portion. The shelf is removable to render the compartment accessible for camera storage purposes and is replaceable over a camera stored in the compartment.

---

This invention concerns a camera case generally and more particularly a camera case designed primarily for transportation of a camera and accessories and the display thereof.

Many camera cases have been designed with the particular purpose of transporting and displaying a camera and/or a camera and accessories; however, the conversion of a transporting case to a display case is universally a cumbersome project. For instance, in many cases the camera case, when in display position, is not self-supporting and therefore requires further supporting structure for this purpose. Also, many cases require significant rearrangement of the contents for conversion to use for display purposes.

Accordingly, a primary object of the present invention is to provide a camera case which is self-supporting in the display position and which may be used conveniently for transporting a camera and/or accessories.

A further object is to provide such as camera case which by its design necessitates a minimum of rearrangement for display purposes and which is transportable both in the opened or closed position.

These and other objects are accomplished in one illustrative embodiment of the invention which features a rigid injection molded case which is diagonally divided by an opening and post-formed hinge into a body portion and a cover portion, the cover portion comprising integrally molded brackets for securing camera accessories. The body portion has associated therewith means for anchoring a shoulder strap and further means for protecting and/or supporting a camera.

Other objects, features and embodiments are contemplated and will be apparent from the following more detailed description of the invention and accompanying drawings, wherein:

FIG. 1 is a perspective representation of the camera case in display position;

FIG. 2 is a perspective representation of the camera case with the camera in protected position in the body portion and the camera case being arranged for closure; and FIG. 3 is a back view perspective representation of the camera case in closed position.

Referring first to FIG. 1 there is shown a camera case 10 having a body portion 12 and a cover portion 14, with the body and cover being attached by post-formed hinge construction 16. Securing means 18 is provided on the cover portion 14, which comprises rigid brackets 20 for securing therein such items as film box 22, a flash bulb package 24, batteries 26, etc. The body portion 12 comprises shoulder strap anchoring means 28 to which is secured shoulder straps 30. The camera case in display position provides means for supporting 32, upon which is placed camera 34. It may be seen that the display position is useful not only for sales promotion but is further useful by the consumer to display his camera and accessories by placing the shoulder strap 30 in position on his shoulder for carrying the case in the position shown in FIG. 1. Furthermore, if the camera case 10 is used for display purposes in sales promotion, one major feature of the construction is its self-supporting capability. When the camera is in the display position, the bottom surface 36 (shown in FIG. 3) of the supporting protrusion 39 is coextensive with the bottom 37 of the body portion 12 and parallel to a supporting base (not shown) or ground.

If the consumer desires storage of his camera and accessories, the liftable supporting means 32 is removed and the camera inserted in the body portion 12, so that the liftable supporting means 32 can be reinserted to the body portion in a protecting position for the camera. The accessories are left in the same position as for display and the camera case 10 is thereby ready for closure. FIG. 2 clearly illustrates the mating capability of closure means 18 with the closure means 38 on the body portion 12.

FIG. 3 represesnts the back view of the camera case 10 showing the closed position wherein the securing means 18 and 38 are properly mated. It should be mentioned that the post-formed hinge construction is such that approximately one million openings of the camera case can be performed without damage to the hinge at room temperature; and further, it has been found that approximately ten thousand openings can be performed at an extreme temperature such as —37° F.

I claim:
1. In a camera storage, carrying and display case including a hollow body portion having a rigid bottom and sides and a hollow cover portion having a rigid top and sides with said portions hinged together to permit opening and closing of the case, the improvement comprising:
   the cover portion having a protrusion extending externally along said top thereof which when the case is fully opened is coplanar with said bottom of said body portion for leveling said case upon a plane surface for display purposes; and
   camera supporting means in said body portion with a camera storage compartment therebeneath, said supporting means being available for supporting a camera intended to be displayed in said case when the case is fully opened and removable to render said storage compartment accessible for placing the camera therein, the supporting means further being replaceable to permit closing of the case with both said camera and supporting means contained for storage and carrying purposes.

References Cited
UNITED STATES PATENTS
2,960,137  11/1960  Lipsitz _____ 150—52
3,106,602  10/1963  Hartz _____ 174—60

FOREIGN PATENTS
21,031  9/1902  Great Britain.

DONALD F. NORTON, Primary Examiner.
JOSEPH R. LECLAIR, Examiner.
F. T. GARRETT, Assistant Examiner.